US008600154B2

(12) United States Patent
Umeda et al.

(10) Patent No.: US 8,600,154 B2
(45) Date of Patent: Dec. 3, 2013

(54) IMAGE PROCESSING APPARATUS AND IMAGE PROCESSING METHOD

(75) Inventors: Kiyoshi Umeda, Kawasaki (JP); Ryosuke Iguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1104 days.

(21) Appl. No.: 12/168,252

(22) Filed: Jul. 7, 2008

(65) Prior Publication Data

US 2009/0034840 A1    Feb. 5, 2009

(30) Foreign Application Priority Data

Jul. 31, 2007 (JP) ................................ 2007-199902

(51) Int. Cl.
*G06K 9/00* (2006.01)
*G06K 9/40* (2006.01)

(52) U.S. Cl.
USPC .......................................... 382/164; 382/275

(58) Field of Classification Search
None
See application file for complete search history.

(56) References Cited

U.S. PATENT DOCUMENTS

| 7,006,668 | B2 | 2/2006 | Iguchi et al. | 382/108 |
| 7,167,205 | B2 | 1/2007 | Akiyama et al. | 348/364 |
| 7,221,792 | B2 | 5/2007 | Matsuda et al. | 382/167 |
| 2003/0090750 | A1* | 5/2003 | Takahashi | 358/516 |
| 2003/0184660 | A1* | 10/2003 | Skow | 348/223.1 |
| 2004/0012801 | A1* | 1/2004 | Murakami | 358/1.9 |
| 2005/0244072 | A1* | 11/2005 | Imai | 382/254 |
| 2006/0182338 | A1* | 8/2006 | Toyoda et al. | 382/167 |
| 2007/0091185 | A1* | 4/2007 | Lee et al. | 348/223.1 |
| 2007/0248279 | A1 | 10/2007 | Akiyama et al. | 382/274 |

FOREIGN PATENT DOCUMENTS

| CN | 1460917 A | 12/2003 |
| JP | 2001-313839 | 11/2001 |
| JP | 3584389 | 8/2004 |

OTHER PUBLICATIONS

Chinese Office Action issued in the counterpart application No. 200810144471.4, dated Jan. 29, 2010—15 pages.

* cited by examiner

*Primary Examiner* — Claire X Wang
*Assistant Examiner* — Thomas A James
(74) *Attorney, Agent, or Firm* — Fitzpatrick, Cella, Harper & Scinto

(57) ABSTRACT

In an image processing apparatus for carrying out a plurality of correction processes on an input image, a multi-dimensional histogram of the input image is calculated, and a feature amount of the input image for which a specific correction process has been carried out is analyzed based on the multi-dimensional histogram. Then, based on the result of the analysis, correction parameters to be used for another correction process are calculated.

11 Claims, 13 Drawing Sheets

F I G. 5
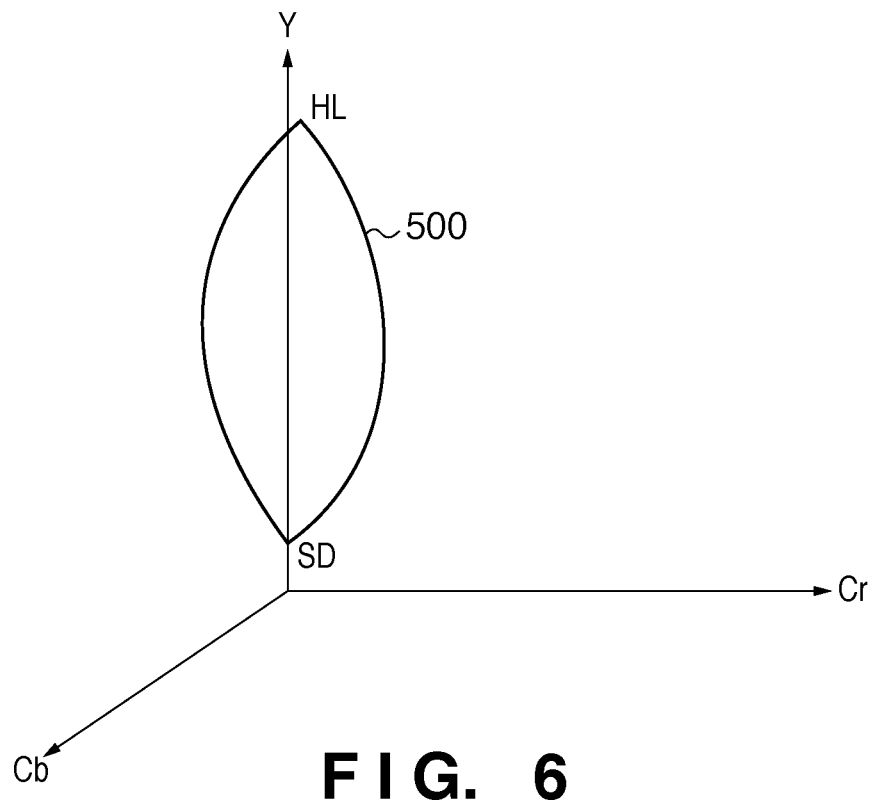
F I G. 6
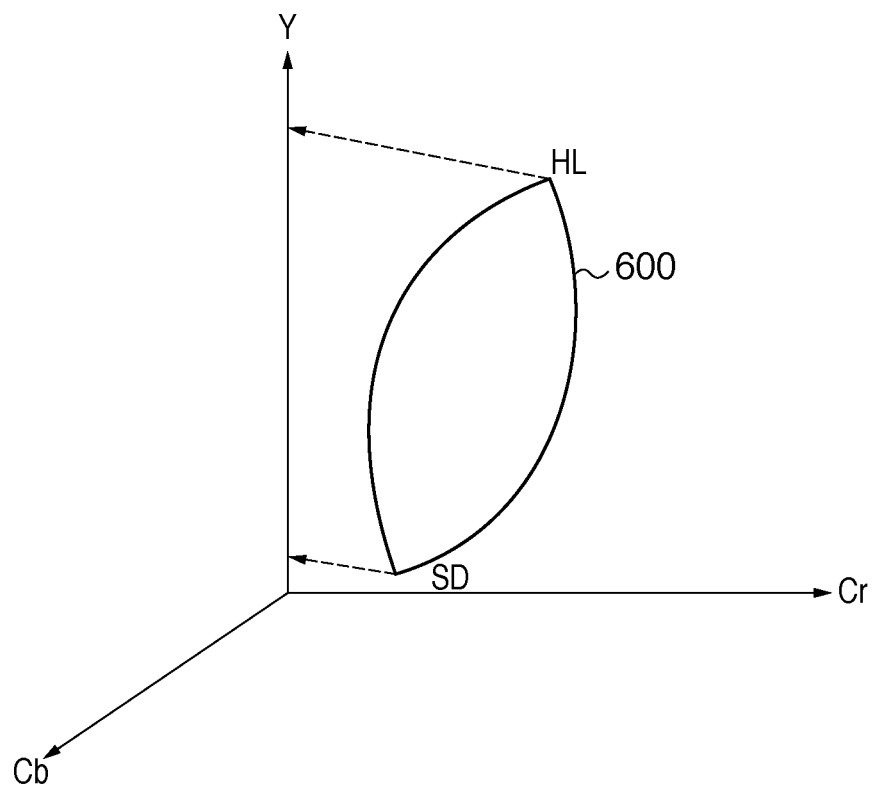

IMAGE PROCESSING APPARATUS AND IMAGE PROCESSING METHOD

BACKGROUND OF THE INVENTION

1. Field of the Invention

The present invention relates to an image processing apparatus and an image processing method for carrying out a correction process on an input image.

2. Description of the Related Art

Conventionally, there have been proposed various image correction and retouching processes carried out on captured image data by software operating in devices such as digital cameras, digital video cameras, and printers, or in personal computers (PCs).

For example, Japanese Patent Laid-Open No. 2001-313839 describes calculating a color correction amount from image data after performing a tone correction to obtain desired data for a precise color correction, where the tone correction is carried out on image data and then the color correction is carried out.

Additionally, Japanese Patent Publication No. 3584389 describes carrying out a high-contrast process on image data obtained by scanning color negatives, and converting a specific hue in the image data to a desired hue after the high-contrast process.

For example, when an extreme blue fog has occurred in the input image, it is difficult to detect how much of a skin tone is included in the input image, and thus the following scenario can be considered. When some kind of skin tone correction is to be carried out on such an image, a color-fog correction is first carried out on the input image in order to adjust the overall image to an appropriate color balance. The resulting intermediate image is then stored in a memory, a skin tone region is detected from the intermediate image, and the appropriate correction is carried out.

Under the above-described state, by processing the two correction functions for different purposes, that is, the color-fog correction and the skin tone correction, in series, desired image data can be produced.

However, there are two problems with such a method. First, when two corrections are processed in series, a memory for storing the intermediate image of the result of the first process is necessary. Second, for example, in the example described above, the color-fog correction is carried out for each pixel in the input image; therefore, even when the input image is, for example, a relatively small VGA size, 300,000 or more computations are necessary in the color-fog correction.

Therefore, when executing a plurality of image corrections in series on the input image, reducing the size of the input image as much as possible can be considered as a way to decrease the size of the intermediate image and the amount of computation for producing the intermediate image.

However, when the size of the input image and the intermediate image is reduced, the image resolution is reduced by the same amount, thereby making it difficult to accurately calculate an image feature amount for calculating the correction amount, and as a result, it may become difficult to obtain the desired image.

Also, in general image analysis, there has been proposed a method for calculating a one-dimensional histogram for the luminance and each of the RGB components, and calculating image correction parameters by using the histogram.

However, changes in the luminance distribution and the distribution of each of the RGB components cannot be comprehended from such a one-dimensional histogram. For example, the distribution of skin tones, pink, or emerald green cannot be comprehended based on such information, and the only method was to refer to the input image again for the image analysis.

SUMMARY OF THE INVENTION

It is an object of the present invention to calculate an accurate image correction amount with a small computation amount without producing an intermediate image.

According to one aspect of the present invention, there is provided an image processing apparatus for carrying out a plurality of correction processes on an input image, comprising: a first calculation unit adapted to calculate a multi-dimensional histogram of the input image; an analysis unit adapted to analyze a feature amount of the input image for which a specific correction process has been carried out based on the multi-dimensional histogram; and a second calculation unit adapted to calculate correction parameters to be used by a correction process carried out after the specific correction process based on the result of the analysis.

According to another aspect of the present invention, there is provided an image processing method carried out by an image processing apparatus carrying out a plurality of correction processes on an input image, the method comprising: calculating a multi-dimensional histogram of the input image; analyzing a feature amount of the input image for which a specific correction process has been carried out based on the multi-dimensional histogram; and calculating correction parameters to be used by a correction process carried out after the specific correction process based on the result of the analysis.

Further features of the present invention will become apparent from the following description of exemplary embodiments (with reference to the attached drawings).

BRIEF DESCRIPTION OF THE DRAWINGS

FIG. 5 is a diagram illustrating a distribution of an input image in a luminance/chrominance space (for example, YCbCr space).

FIG. 6 is a diagram illustrating a distribution of an input image in a luminance/chrominance space when white balance is out-of-balance.

DESCRIPTION OF THE EMBODIMENTS

Hereinafter, embodiments of the present invention shall be described in detail with reference to the accompanying drawings.

First Embodiment

Figure 1:
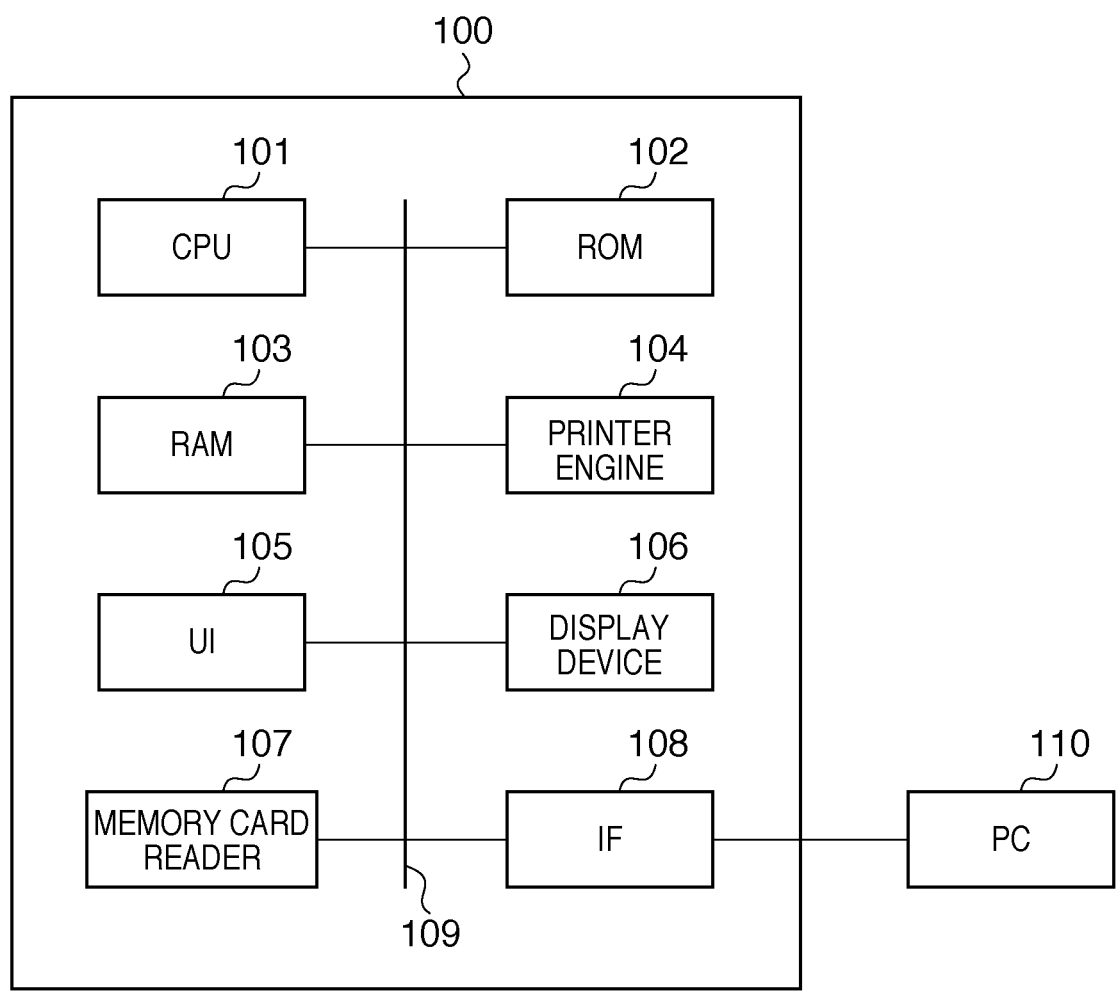
FIG. 1 is a diagram illustrating an example of a hardware configuration of an image processing apparatus in a first embodiment.

FIG. 1 is a diagram illustrating an example of a hardware configuration of an image processing apparatus in the first embodiment. In FIG. 1, 101 is a CPU, 102 is a ROM, and 103 is a RAM. 104 is a printer engine, and 105 is a user interface (UI) configured of a keyboard, a button, a touch panel, and so on.

106 is a display device such as a liquid crystal display, 107 is a memory card reader, and 108 is an interface (IF) such as USB. Each of these components is connected to a system bus 109. There are also cases where the interface 108 is connected to a personal computer (PC) 110 via a USB cable.

The CPU 101 loads a program (including an image processing program described hereinafter) stored in the ROM 102 into the RAM 103, which is a working memory, and executes the program. Then, by controlling each of the above-described components based on the program via the system bus 109, the functionality of the program is realized.

Although a printer is described as an example in the first embodiment, the present invention is not limited thereto, and needles to say can be applied to other devices, such as, for example, digital cameras, copiers, facsimiles, and televisions.

Figure 2:
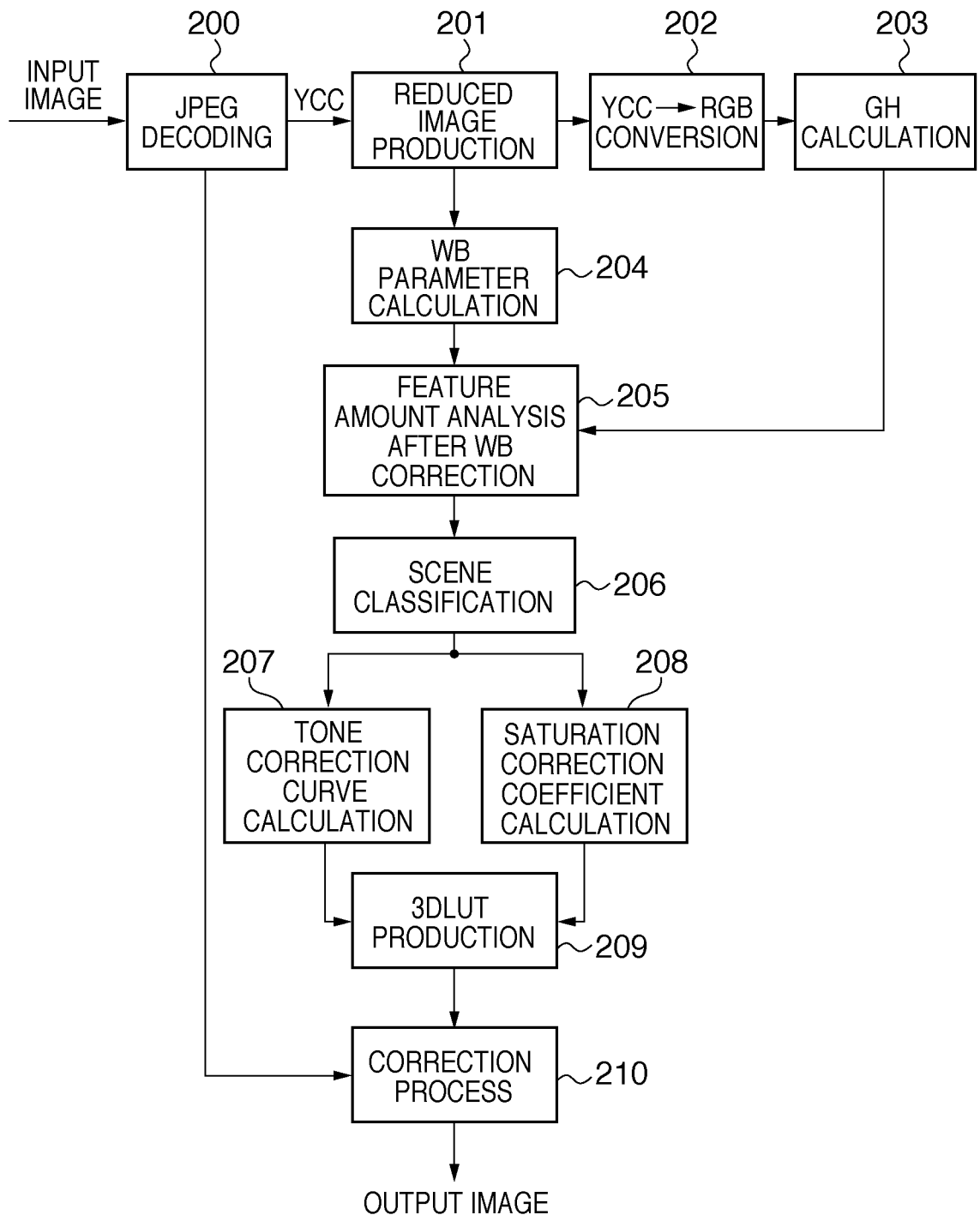
FIG. 2 is a diagram illustrating process blocks in the first embodiment.

FIG. 2 is a diagram illustrating process blocks in the first embodiment, which are processes executed by the CPU 101. First, the image data is generally Exif-JPEG data, and is input via the memory card reader 107 or the interface 108. Then, a decoding (JPEG decoding) process 200 is carried out by a JPEG decoder, and the data is developed in the memory as YCbCr data. The YCbCr data is input into a reduced image producing process 201, and a reduced image is produced by a known technique.

The reduced image is produced in order to reduce amounts of computation in the grid histogram (GH) calculation process and in extracting various image characteristics in a WB parameter calculation process to be mentioned later. Therefore, as a precondition, it is necessary to leave a certain degree of image detail in this reduced image, and it is preferable for the size to be about the size of VGA (640×480 pixels) at minimum.

Then, this reduced image is inputted into a grid histogram (GH) calculation process 203 via a YCC-RGB conversion process 202, and a grid histogram of the input image is calculated. The YCC-RGB conversion process 202 is a known luminance chrominance conversion, and thus a detailed description thereof shall be omitted.

Figure 3:
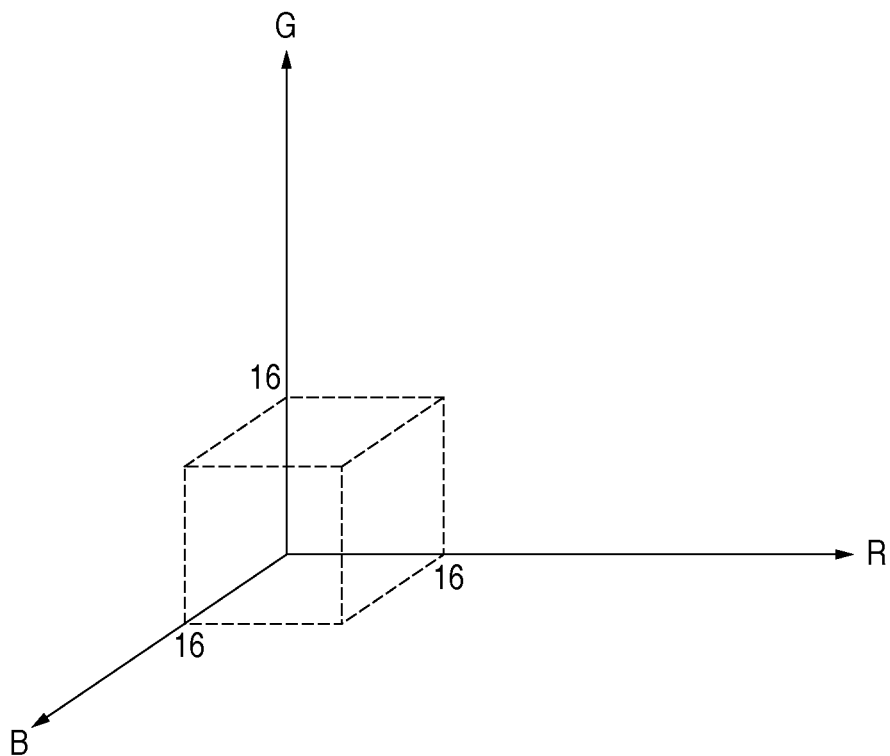
FIG. 3 is a diagram illustrating an RGB three-dimensional space when a grid is produced with a 16-bit unit.

The grid histogram, which is a multi-dimensional histogram, shall be described here. The grid histogram is an RGB histogram in a multi-dimensional space as shown in FIG. 3. The example shown in FIG. 3 illustrates a case where the grid is produced with a 16-unit in a 24-bit (8 bits for each of RGB) RGB three-dimensional space.

Figure 4:
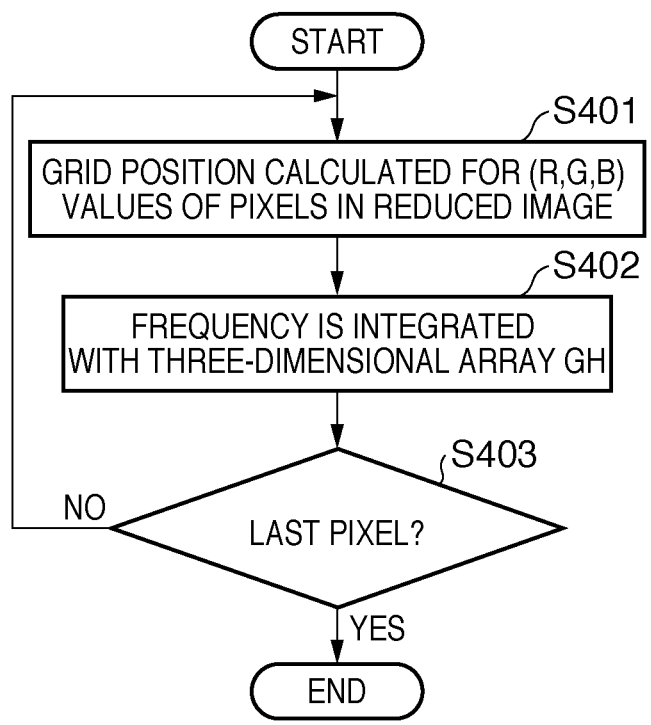
FIG. 4 is a flowchart illustrating procedures of a grid histogram (GH) calculation process 203.

FIG. 4 is a flowchart illustrating procedures of the GH calculation process 203. In S401, a position in the GH grid for each pixel of the input RGB reduced image is calculated. This calculation process is carried out as follows, using the values (R,G,B) of each pixel.

$$G_R = \left[\frac{R+8}{16}\right]$$

$$G_G = \left[\frac{G+8}{16}\right]$$

$$G_B = \left[\frac{B+8}{16}\right]$$

In the above calculation formula, $G_R$, $G_G$, and $G_B$ represent each grid of the grid histogram, and when, for example, (R,G,B)=(16, 16, 16), the position in the grid is calculated as (1, 1, 1).

Then, in S402, the frequency of the calculated grid position is counted up using the three-dimensional array GH illustrated below.

$$GH[G_R]\cdot[G_G]\cdot[G_B]=GH[G_R]\cdot[G_G]\cdot[G_B]+1$$

Then, by carrying out the above process for each pixel in the reduced image (Yes in S403), GH can be calculated.

Although the reduced image is converted from YCbCr data to RGB data and GH is calculated in the RGB three-dimensional space in the first embodiment, the present invention is not limited thereto. For example, a three-dimensional grid may be configured in a YCbCr space and then a similar GH calculation can be carried out, and furthermore, GH may be calculated similarly in a space higher than the three-dimensional space, such as, for example, a four-dimensional space like CMYK.

However, the GH calculation in the RGB space as described above is more advantageous than the GH configured in the YCbCr space with the same number of grids. That is, pixels with high luminance and saturation, such as (Y,Cb,Cr)=(255, 128, 128), do not exist in general image data. Therefore, in the YCbCr space, grid positions with frequency 0 will be present in a large number, and the space cannot be utilized effectively.

On the other hand, in the RGB space, image data is present throughout the entire space, from (R,G,B)=(255, 255, 255) to (R,G,B)=(0, 0, 0). Thus, all the positions in the grid can be effectively used, and as a result, the image information is analyzed in detail, as opposed to the case where the YCbCr space is used. Therefore, in the first embodiment, the descriptions are made assuming that an RGB three-dimensional GH is used.

Then, referring back to FIG. 2, the procedure moves to a white balance (WB) parameter calculation process 204, whereupon the WB state of the whole input image is estimated, and a correction parameter for carrying out a correction to an appropriate WB is obtained. Although the WB correction method is not limited in the present invention and a known technique can be used, herein, a WB correction method using two regions in the image, that is, a bright region (highlight region) and a dark region (shadow region), shall be described as an example.

As shown in FIG. 5, it is known that in the distribution of the input image in the luminance/chrominance space (for example, a YCbCr space), a highlight (HL)/shadow (SD) region 500 is distributed in the proximity of the gray axis (Y-axis) when the input image has an appropriate white balance.

On the other hand, when the white balance is out-of-balance, such as when a color-fog occurs in the input image due to effects of a light source at the time of shooting, an image distribution in the luminance/chrominance space is similar to that indicated by 600 in FIG. 6. To carry out the WB correction on an image with such a distribution, a technique for producing a rotation matrix for bringing the highlight and shadow regions on the gray axis in the luminance/chrominance space, and using a conversion formula as shown below for correction is known. The 3×3 rotation matrix in this conversion formula is taken as WB correction parameters.

$$\begin{bmatrix} Y' \\ Cb' \\ Cr' \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} Y \\ Cb \\ Cr \end{bmatrix}$$

Here, a method for calculating a WB correction parameter by producing a three-dimensional rotation matrix shall be described with reference to FIG. 7.

Figure 7:
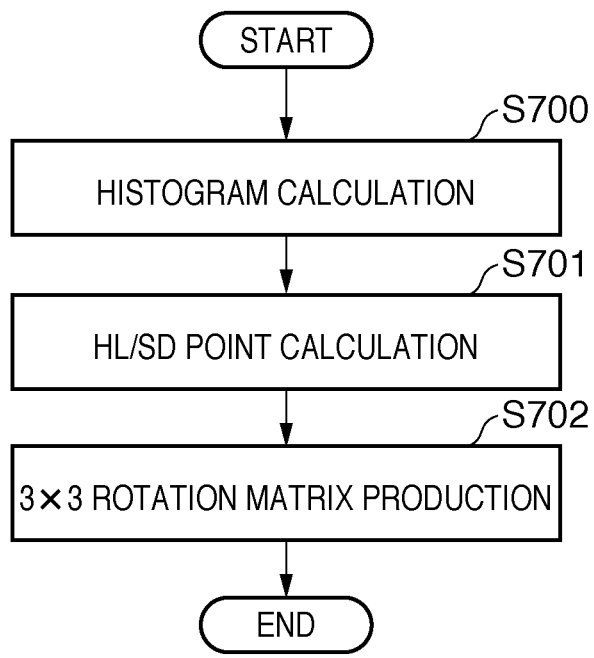
FIG. 7 is a flowchart illustrating a WB correction parameter calculation process in the first embodiment.

FIG. 7 is a flowchart illustrating a WB correction parameter calculation process in the first embodiment. First, in S700, a histogram of the reduced image is calculated. For the histogram, a cumulative luminance histogram and average values of Cb and Cr in each luminance are calculated. Then, in S701, points for highlight and shadow are calculated. For these points, for example, the above-mentioned cumulative luminance histogram is referred to, and a point where the cumulative frequency is 99% of the reduced image as a whole is regarded as the highlight point, whereas a point where the cumulative frequency is 1% of the reduced image as a whole is regarded as the shadow point.

Then, in S702, a 3×3 rotation matrix that plots those two points, that is, the highlight point and the shadow point, on the gray axis is produced. The method for producing the 3×3 rotation matrix is known based on various documents, and therefore detailed description thereof shall be omitted.

Then, referring back to FIG. 2, proceeding to a feature amount analysis process 205, analysis parameters for analyzing the feature amount of various images, that is, the input image after the application of the WB correction, are calculated.

Figure 8:
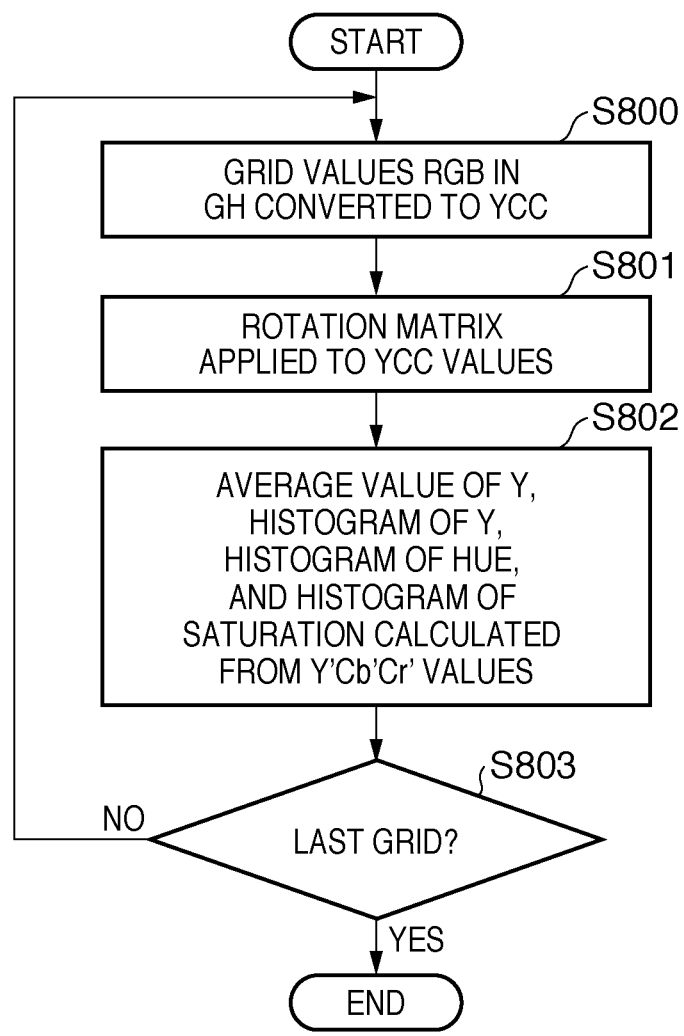
FIG. 8 is a flowchart illustrating a process for calculating various image analysis parameters.

FIG. 8 is a flowchart illustrating a process for calculating various image analysis parameters. First, in S800, respective grid values (R,G,B) and frequencies of each grid in GH are obtained. Then, in S801, respective (R,G,B) values are converted to (Y,Cb,Cr) values. For the converted (Y,Cb,Cr) values, post-WB correction values (Y',Cb',Cr') are obtained by using the rotation matrix calculated in the WB parameter calculation process 204.

Then, in S802, by using the post-WB correction values and the frequencies of the grid obtained in S801, the average value of luminance, a histogram of luminance, a histogram of hue, the average saturation, and so on are calculated. The calculation of hue and saturation may be HIS-type calculation, or the calculation may be performed using the distance from the hue angle to the origin in the Cb-Cr plane. Then, the above-described process is carried out for all grids in GH (Yes in S803).

As described above, when various analysis parameters are to be calculated from the post-WB correction image, calculating a histogram for each pixel in the reduced image necessitates, in the case of a VGA-size image, about 300,000 computations.

However, in the case when a method using a grid histogram as described in the first embodiment is used, when the grid unit of the GH is, for example, 16, the points in all the grids are $17^3=4913$, which means that with about 5000 computations, the image features can be substantially grasped. This is an extremely important advantage in an environment where the CPU shown in FIG. 1 has poor processing abilities.

Based on the analyzed information, in the tone correction curve calculation process and the saturation correction coefficient calculation process, a one-dimensional tone curve for the tone correction is selected, and calculation of the coefficient values for the saturation correction is carried out.

Figure 9:
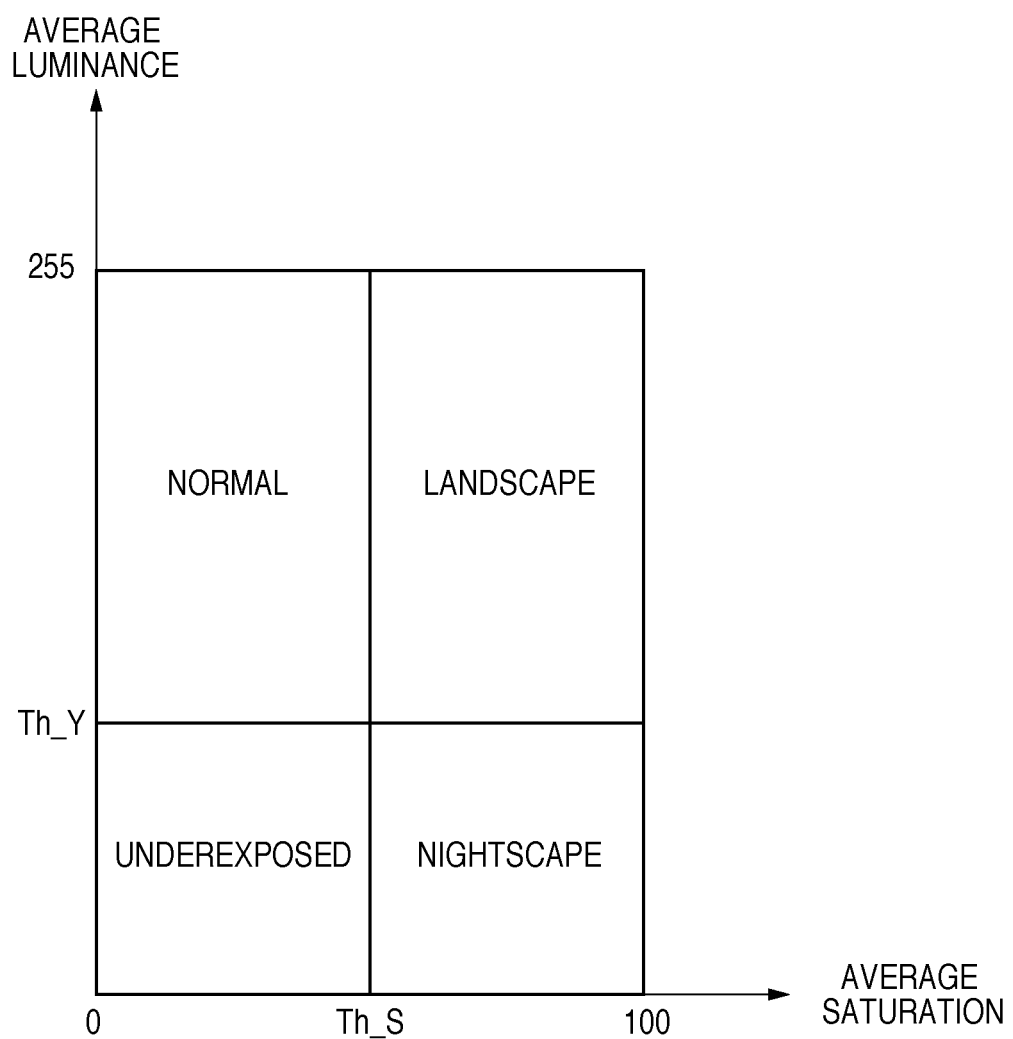
FIG. 9 is a diagram illustrating scene classification in the first embodiment.

These values are determined according to the scene classification table shown in FIG. 9. FIG. 9 is a diagram illustrating a scene classification in the first embodiment. FIG. 9 shows a very simplified scene classification (determination). To be specific, scenes are divided into four classifications based on the relations of the image analysis values analyzed based on the GH and the WB correction parameters (average luminance, average saturation).

When the average luminance and the average saturation are not less than thresholds (Th_Y, Th_S), the scene is classified as a landscape scene, and when the average luminance and the average saturation are below the thresholds, the scene is classified as an underexposed scene. When the average saturation is not less than the threshold and the average luminance is below the threshold, the scene is classified as a nightscape scene, and in all other cases, the scene is classified as a normal scene. Such a scene classification is carried out in a scene classification process 206 shown in FIG. 2.

In this manner, in the first embodiment, by analyzing the image status after applying the WB correction to the input image using GH, a correct scene classification process can be carried out based on the status after adjusting the color balance.

Figure 10:
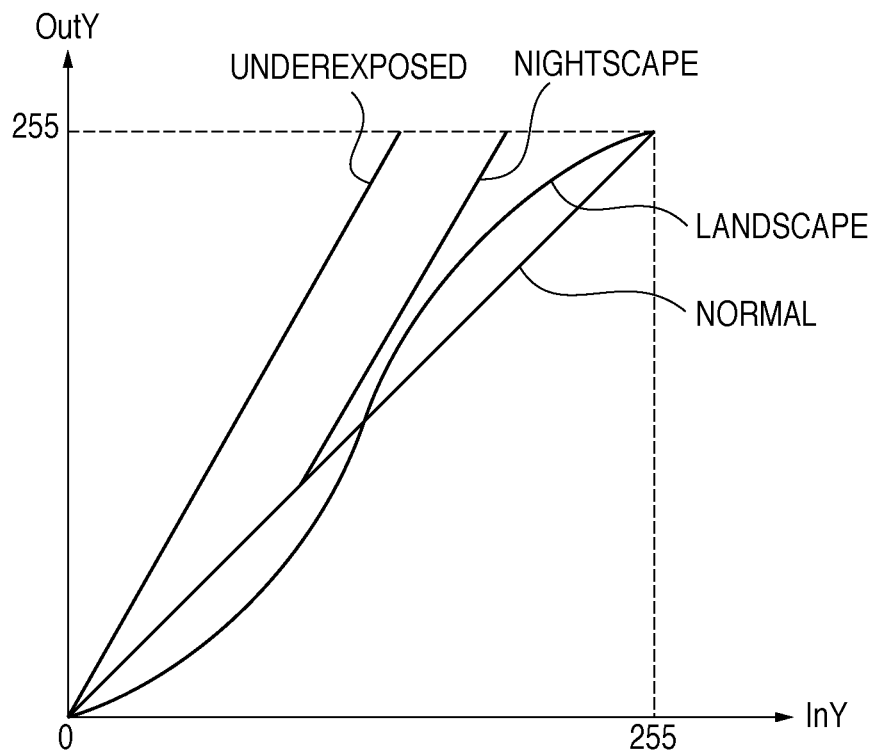
FIG. 10 is a diagram illustrating an example of tone correction curves used in the first embodiment.

In a tone correction curve calculation process 207, a tone correction curve is determined based on the results of the scene classification described above. FIG. 10 is a diagram illustrating an example of tone correction curves used in the first embodiment. Although four tone curves are shown here for simplification, the present invention is not limited thereto.

To be specific, for the underexposed scene, a straight line ("Underexposure" shown in FIG. 10) for enhancing the overall brightness is set. For the landscape scene, a curve ("Landscape" shown in FIG. 10) for enhancing the overall contrast is set. For the nightscape scene, a straight line ("Nightscape" shown in FIG. 10) for causing the dark area to stand out and for highlighting bright regions is set. Finally, for the normal scene, a straight line ("Normal" scene in FIG. 10) that does not do anything is set. The curve is selected based on the result of the scene classification, and stored in a memory as a one-dimensional Look Up Table (1DLUT).

Figure 11:
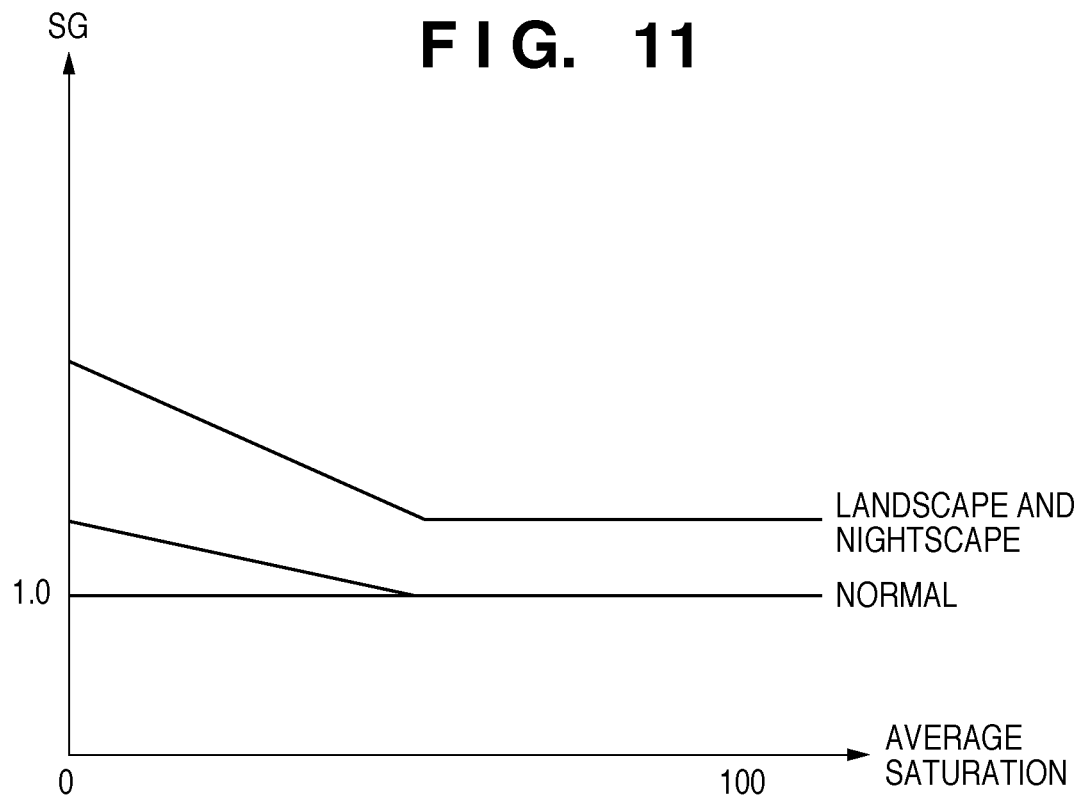
FIG. 11 is a diagram illustrating weighting straight lines for calculating a saturation emphasis coefficient for every scene.

FIG. 11 is a diagram illustrating weighting straight lines for calculating a saturation emphasis coefficient for each scene. In FIG. 11, the vertical axis is a saturation emphasis gain (SG), and the horizontal axis is an average saturation obtained in the feature amount analysis process 205 after the WB correction. In a saturation correction coefficient calculation process 208, SG is calculated, based on the upper-side curve if the scene has been classified as a landscape scene or nightscape scene, or based on the lower-side curve if the scene has been classified as a normal scene.

In any of the curves, saturation emphasis is carried out actively when the average saturation is low, and SG is set to 1.0 when the average saturation is not less than a predetermined value in order to avoid excessive saturation emphasis.

Based on the above-described process, an RGB three-dimensional Look Up Table for correction is produced through a 3DLUT producing process 209 by using the determined WB correction parameters, one-dimensional Look Up Table for tone correction, and saturation emphasis gain.

Figure 12:
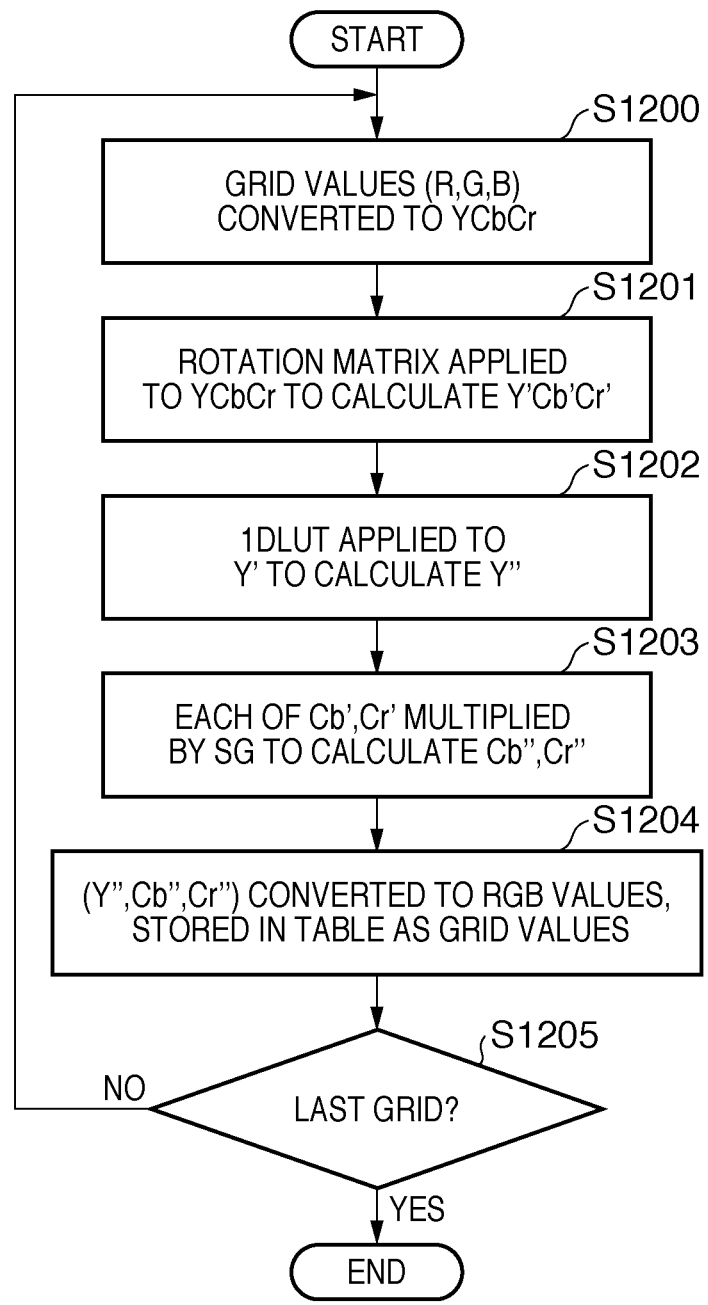
FIG. 12 is a flowchart illustrating a process for producing a three-dimensional Look Up Table.

FIG. 12 is a flowchart illustrating a process for producing a three-dimensional Look Up Table. First, in S1200, each of the grid values (R,G,B) in the LUT is converted to (Y,Cb,Cr). Then, in S1201, the rotation matrix for carrying out the WB correction is applied to the converted (Y,Cb,Cr), to calculate (Y',Cb',Cr'). Then, in S1202, the 1DLUT for the tone correction is applied to value Y', to calculate value Y" after the luminance correction.

Then, in S1203, (Cb',Cr') are multiplied by SG, to calculate values (Cb",Cr") after the saturation correction. Then, in S1204, the post-correction values (Y",Cb",Cr") are converted to RGB values, and stored in the 3DLUT as grid values. The above-described process is carried out for all of the grids in the 3DLUT (Yes in S1205), thereby completing a table for correction.

After this, in a correction process 210, an output image of the original resolution, a print resolution, or a display resolution is produced based on a known interpolation method (for example, tetrahedron interpolation) by using the 3DLUT for correction produced for the reduced input image.

The produced output image may be stored in a storage device, displayed on a display device, or sent to a printer engine to be printed.

According to the first embodiment, an RGB grid histogram is produced for a reduced image, which is obtained by reducing the input image, and a WB correction parameter is calculated from the reduced image. Then, by applying the WB correction parameter to the grid histogram rather than to the reduced image, the status of the image after the WB correction can be accurately estimated despite the small memory and the small amount of computation.

In the first embodiment, because the scene classification, the tone correction curve, and the saturation emphasis coefficient that follow are obtained based on such estimation, scene classification and calculation of the correction amount more accurate than was possible conventionally can be achieved.

Second Embodiment

A second embodiment of the present invention shall described in detail with reference to the drawings. In the second embodiment, the case described is a case where a skin tone region is detected in an input image in which a color-fog has occurred, and an appropriate skin tone correction is carried out in accordance with that status.

The configuration of an image processing apparatus in the second embodiment is the same as the configuration of the image processing apparatus in the first embodiment as described using FIG. 1, and therefore description thereof shall be omitted.

Figure 13:
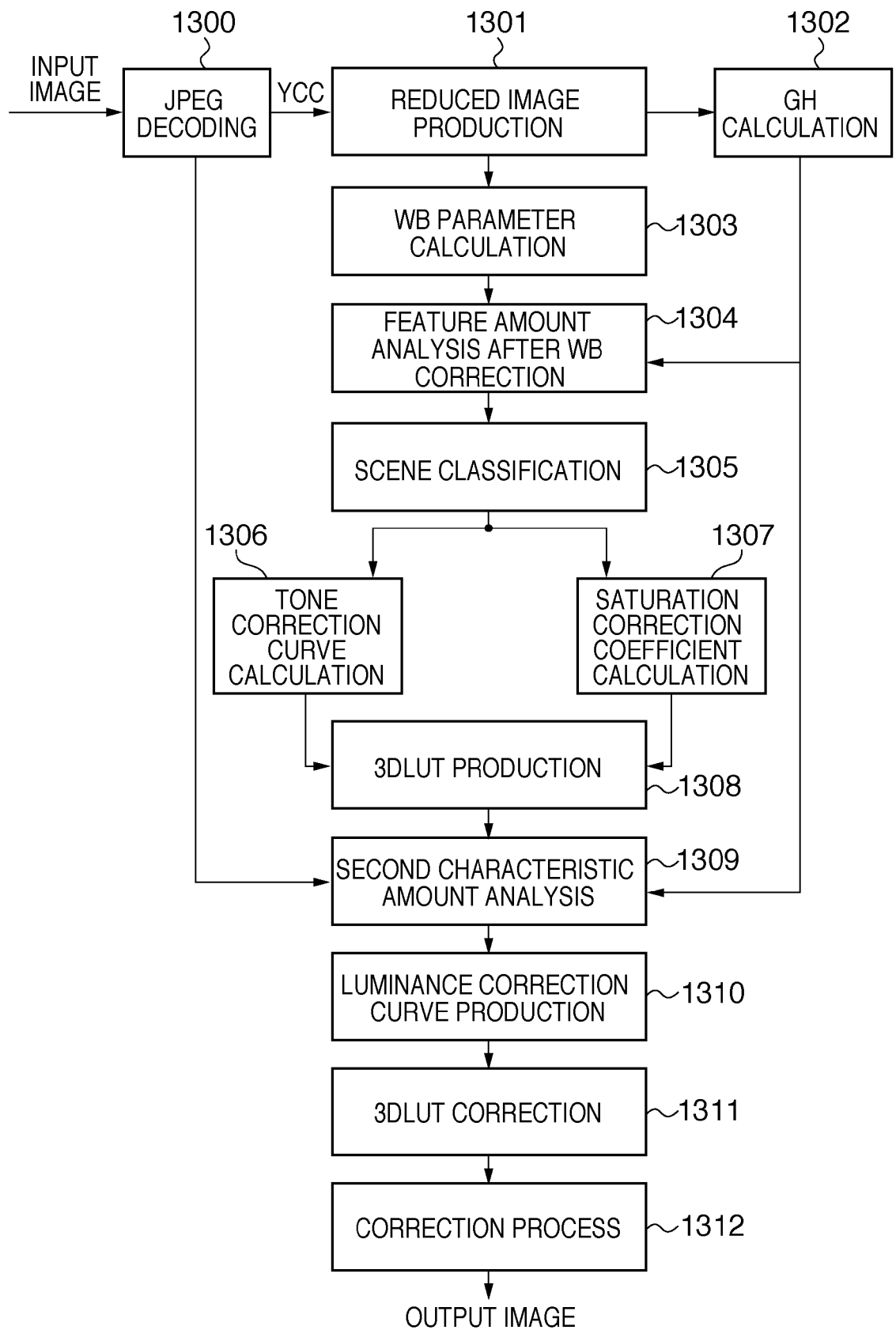
FIG. 13 is a diagram illustrating process blocks in a second embodiment.

FIG. 13 is a diagram illustrating process blocks in the second embodiment. The processes of calculating the GH and the WB correction parameters for the input image, carrying out the scene classification, and producing the first 3DLUT (1300 to 1308) are the same as those of the first embodiment, and thus the description thereof shall be omitted here.

Figure 14:
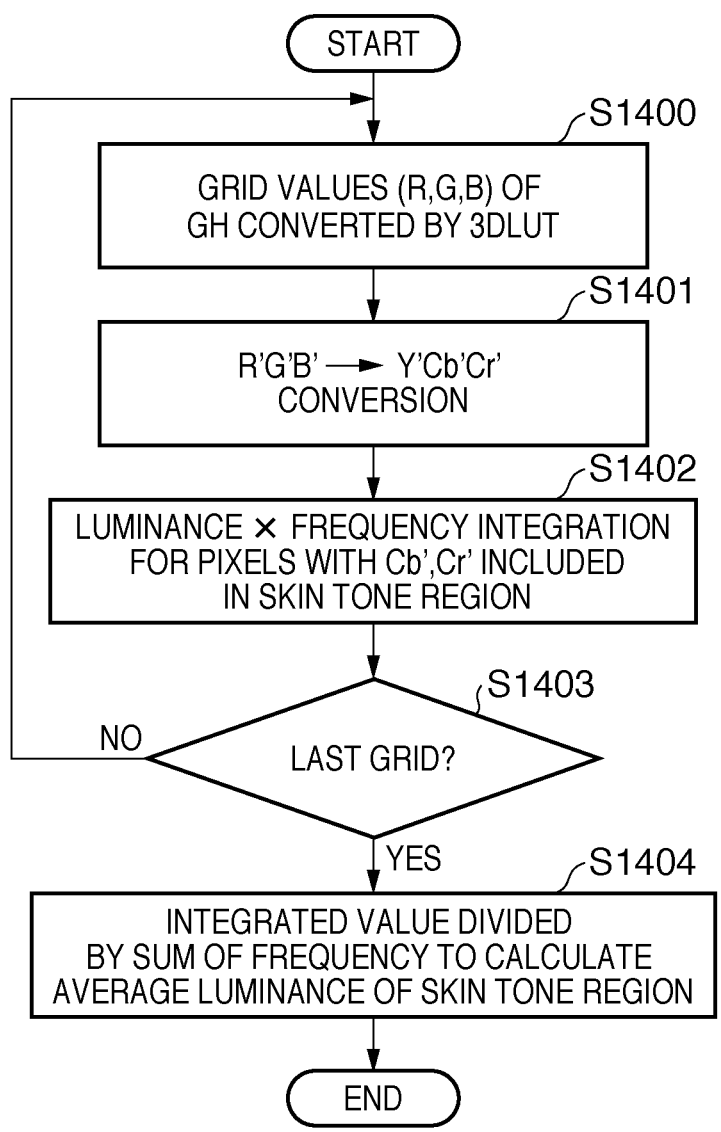
FIG. 14 is a flowchart illustrating a second feature amount analysis process.

In the second embodiment, in a second feature amount analysis process 1309, distribution of a skin tone region is analyzed by using the 3DLUT and the GH. FIG. 14 is a flowchart illustrating the second feature amount analysis process.

First, in S1400, post-correction values (R',G',B') of values of each grid in the GH (R,G,B) are calculated based on a known interpolation method (for example, tetrahedron interpolation) by using the 3DLUT produced in the 3DLUT producing process 1308. Then, in S1401, the calculated (R',G',B') are converted to (Y', Cb',Cr').

Figure 15:
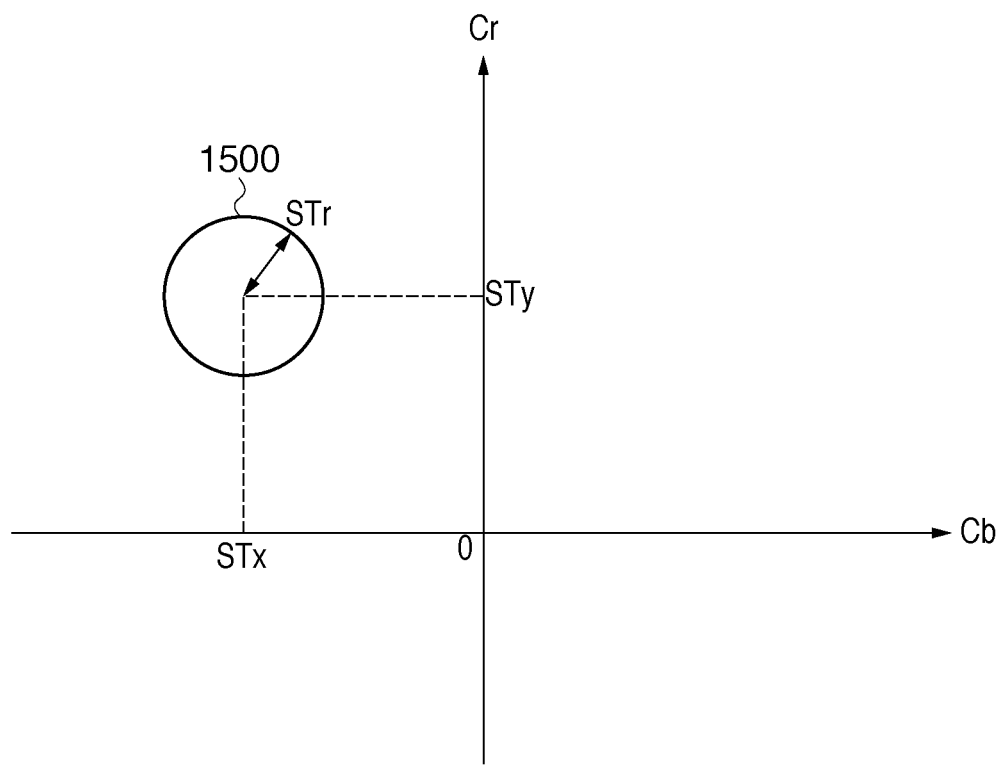
FIG. 15 is a diagram illustrating an example of a skin tone region definition.

Then, a determination is made as to whether (Cb',Cr') converted in S1401 are included in a defined skin tone region. FIG. 15 is a diagram illustrating an example of a skin tone region definition. In FIG. 15, for simplification, a circle region 1500 with a center position of (STr,STy) and a radius of STr in a Cb-Cr plane is defined as the skin tone region. However, the present invention is not limited thereto, and any definitions for forms and areas may be used.

When (Cb',Cr') are included in the defined skin tone region as a result of the determination, in order to calculate an average luminance of the skin tone region in S1402, the frequency of the grid is multiplied by luminance Y' for integration. Then, the above-described process is carried out for all the grids in GH (Yes in S1403), and the integrated value is divided by the sum of the frequency of GH in S1404, to calculate the post-WB correction average luminance of the skin tone region.

Figure 16:
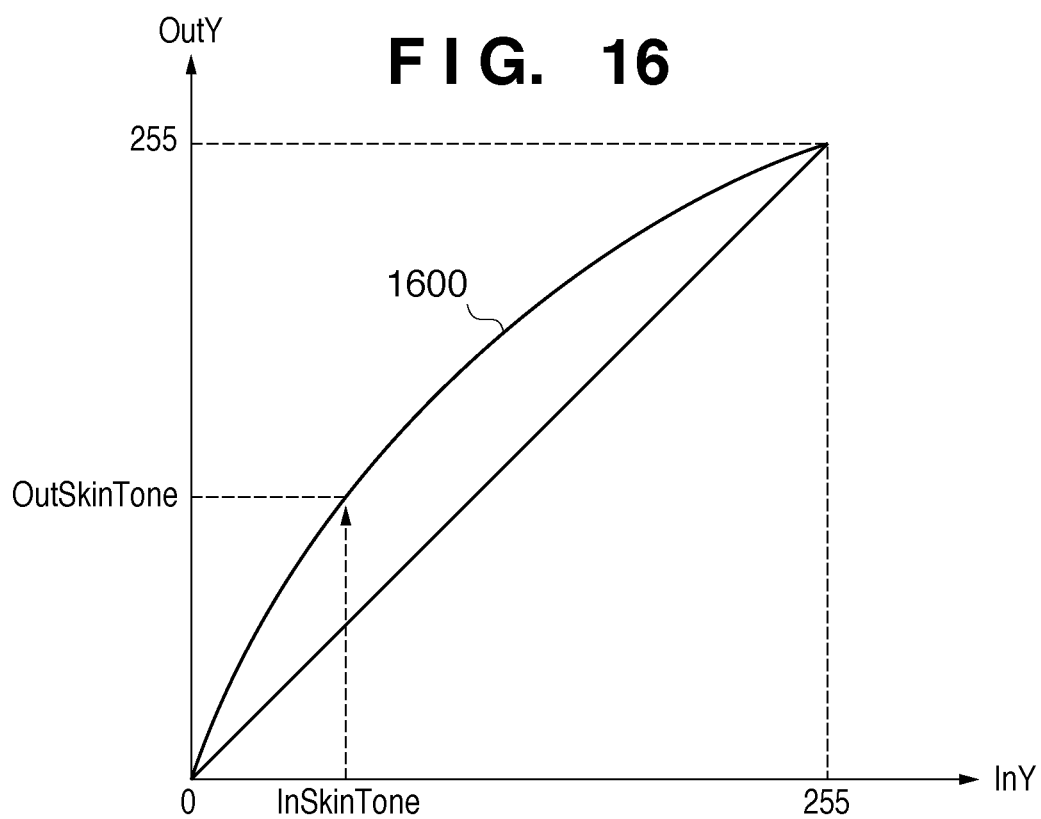
FIG. 16 is a diagram illustrating an example of a luminance correction curve for a skin tone region.

Then, referring back to FIG. 13, based on the calculated average luminance of the skin tone region, a curve for skin tone luminance correction is calculated in a luminance correction curve producing process 1310. FIG. 16 is a diagram illustrating an example of a luminance correction curve for the skin tone region.

As shown in FIG. 16, a luminance correction curve 1600 is produced. The luminance correction curve 1600 is generated so that when the average luminance of the calculated skin tone region is regarded as InSkinTone, the value thereof is OutSkinTone, that is, a target brightness, and (InY, OutY) satisfy (0, 0) and (255, 255). The luminance correction curve 1600 may be a simple gamma curve, or a curve configured with a straight line that achieves the above conditions. Then, the produced curve is stored in the memory as a 1DLUT.

Figure 17:
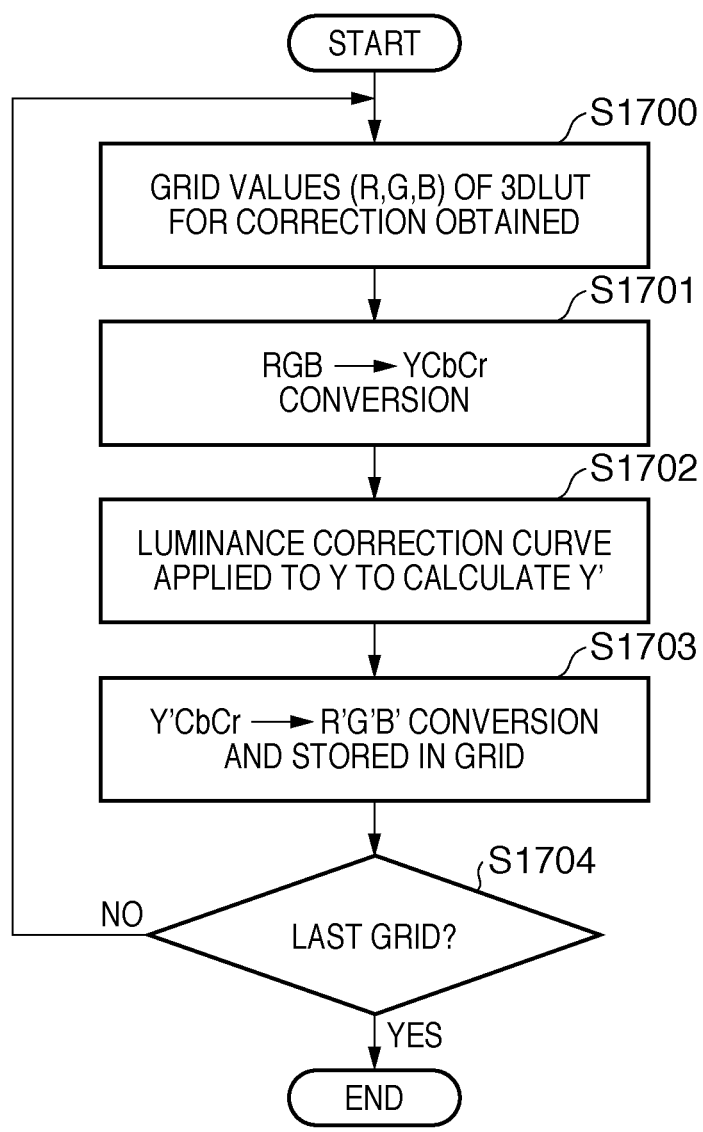
FIG. 17 is a flowchart illustrating a 3DLUT correction process.

Then, upon completing the production of the luminance correction curve, a 3DLUT correction is carried out in a 3DLUT correction process 1311. FIG. 17 is a flowchart illustrating the 3DLUT correction process.

First, in S1700, values of the grid (R,G,B) of the 3DLUT for correction are obtained, and the values are converted to YCbCr in S1701. Then, in S1702, the above-described luminance correction curve 1600 is applied to Y, to obtain Y'. Then, in S1703, (Y', Cb,Cr) are converted to (R',G',B'), and stored in grid values. The above-described process is carried out for all of the grids in the 3DLUT for correction (Yes in S1704), thereby completing the correction process for the LUT.

After this, in a correction process 1312, an output image is produced based on a known interpolation method (for example, tetrahedron interpolation) by using the 3DLUT for correction on the input image of the original resolution.

The produced output image may be stored in a storage device, displayed on a display device, or sent to a printer engine to be printed.

According to the second embodiment, the image status after carrying out basic image corrections such as the WB correction, the tone correction, and saturation correction, is simulated using GH, and distribution of the skin tone region after the basic corrections can then be accurately estimated based thereupon. Because only GH is necessary for the estimation, the correction parameters can be calculated accurately in an extremely memory-efficient manner and with a small amount of computation, compared to the case where a VGA size intermediate image is used.

Also, instead of a one-dimensional histogram (a histogram for each of the luminance and the RGB components) generally obtained for the input image, a three-dimensional histogram in the RGB space is used. By carrying out the image analysis by using this three-dimensional histogram, color distribution analysis that has not been able to be calculated by a general one-dimensional histogram can be achieved. Therefore, correction parameters that have not been able to be obtained by a one-dimensional histogram can be calculated.

In the second embodiment, a 3DLUT for a basic image correction is produced first, and the skin tone region is estimated by using the GH to calculate the correction amount, thereby correcting the produced 3DLUT. Through this process, a correction process needs to be carried out for the image of the original resolution only once at the end of the procedure; the second embodiment is therefore also advantageous in that a final output image is produced by efficient processes.

Although the luminance correction process for the skin tone region after the basic image correction process is described in the second embodiment, the present invention is not limited thereto. For example, by analyzing the distribution of specific colors such as the sky, mountain greenery, and so on using GH after the image correction process, a suitable process based on the results (for example, saturation correction and hue correction) can be carried out.

Also, although the white balance correction is carried out for the reduced image to analyze the feature amount of the image in the first embodiment and the second embodiment, the correction to be carried out for the reduced image may also be any image correction process other than the white balance correction. In such a case, the feature amount analysis is carried out for the image after such an image correction process.

Although an image processing based on RGB and YCbCr data is described, the present invention is not limited thereto. For example, since YCbCr implies dividing components to luminance and chrominance, carrying out the processes using a color space equivalent to these, a uniform color space such as YC1C2 or L*a*b* also naturally falls in the scope of the present invention.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the computer-readable storage medium implements the functionality of the aforementioned embodiment, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiment may be implemented through that processing. It goes without saying that this also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199902, filed Jul. 31, 2007, which is hereby incorporated by reference herein in its entirety.

What is claimed is:

1. An image processing apparatus comprising:
a producing unit that produces a multi-dimensional grid histogram based on values of pixels in an image, wherein the multi-dimensional grid histogram holds the frequency corresponding to a grid value in each grid of a predetermined interval in a multi-dimensional color space;
an analysis unit that performs a first correction process to each grid value of the multi-dimensional grid histogram produced by the producing unit and analyzes a feature amount of the multi-dimensional grid histogram after the first correction process is performed, using each grid value processed by the first correction process and the frequency of the each grid value; and
a calculation unit that calculates correction parameters used for a second correction process based on a result of the analysis by the analysis unit.

2. The apparatus according to claim 1, wherein the producing unit produces the multi-dimensional grid histogram by calculating a position in the grid for each pixel of the image and by counting the frequency of the pixel corresponding to the position of the grid.

3. The apparatus according to claim 1, further comprising a unit that calculates a multi-dimensional Look Up Table used for correcting the image based on each grid value processed by performing the second correction process to each grid value of the multi-dimensional grid histogram after the first correction process is performed, using the correction parameters calculated by the calculation unit.

4. The apparatus according to claim 3, further comprising a unit that corrects the image using the multi-dimensional Look Up Table.

5. The apparatus according to claim 1, wherein the multi-dimensional grid histogram is an RGB three-dimensional histogram.

6. The apparatus according to claim 1, wherein the first correction process is a white balance correction process.

7. The apparatus according to claim 1, wherein the second correction process is a tone correction process or a saturation correction process.

8. The apparatus according to claim 1, further comprising a unit that analyzes the distribution of a specific color based on each grid value of the multi-dimensional grid histogram after each grid value of the multi-dimensional grid histogram produced by the producing unit is corrected using the correction parameter used for correcting the image.

9. The apparatus according to claim 8, further comprising a unit that calculates correction parameters for correcting the luminance of a specific color region in the image from the analyzed distribution of the specific color.

10. An image processing method comprising:
- producing a multi-dimensional grid histogram based on values of pixels in an image, wherein the multi-dimensional grid histogram holds the frequency corresponding to a grid value in each grid of a predetermined interval in a multi-dimensional color space;
- performing a first correction process to each grid value of the multi-dimensional grid histogram produced by the producing step and analyzing a feature amount of the multi-dimensional grid histogram after the first correction process is performed, using each grid value processed by the first correction process and the frequency of the each grid value; and
- calculating correction parameters used for a second correction process based on a result of the analysis by the performing and analyzing step.

11. A non-transitory computer-readable recording medium storing a program for causing a computer to execute an image processing method, the method comprising:
- producing a multi-dimensional grid histogram based on values of pixels in an image, wherein the multi-dimensional grid histogram holds the frequency corresponding to a grid value in each grid of a predetermined interval in a multi-dimensional color space;
- performing a first correction process to each grid value of the multi-dimensional grid histogram produced by the producing step and analyzing a feature amount of the multi-dimensional grid histogram after the first correction process is performed, using each grid value processed by the first correction process and the frequency of the each grid value; and
- calculating correction parameters used for a second correction process based on a result of the analysis by the performing and analyzing step.

* * * * *